(12) United States Patent
Inoue et al.

(10) Patent No.: US 11,760,338 B2
(45) Date of Patent: Sep. 19, 2023

(54) VEHICLE CONTROL APPARATUS

(71) Applicant: SUBARU CORPORATION, Tokyo (JP)

(72) Inventors: Satoshi Inoue, Tokyo (JP); Hiroyuki Akiyama, Tokyo (JP); Naohiko Hirosumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 196 days.

(21) Appl. No.: 17/481,990

(22) Filed: Sep. 22, 2021

(65) Prior Publication Data

US 2022/0097681 A1  Mar. 31, 2022

(30) Foreign Application Priority Data

Sep. 29, 2020  (JP) ................. 2020-162855

(51) Int. Cl.
*B60W 20/40* (2016.01)
*B60W 10/02* (2006.01)
(Continued)

(52) U.S. Cl.
CPC ............ *B60W 20/40* (2013.01); *B60W 10/02* (2013.01); *B60W 10/06* (2013.01); *B60W 10/08* (2013.01);
(Continued)

(58) Field of Classification Search
CPC ...... B60W 20/40; B60W 10/02; B60W 10/06; B60W 10/08; B60W 2510/0208;
(Continued)

(56) References Cited

U.S. PATENT DOCUMENTS

2015/0046011 A1  2/2015 Imai et al.
2017/0282900 A1* 10/2017 Suzuki ................. B60W 10/08
(Continued)

FOREIGN PATENT DOCUMENTS

EP  2977283 B1 * 9/2022 ............... B60K 6/48
JP  2001-245404 A  9/2001
(Continued)

*Primary Examiner* — George C Jin
(74) *Attorney, Agent, or Firm* — McDermott Will & Emery LLP

(57) ABSTRACT

A vehicle control apparatus to be applied to a hybrid vehicle includes a continuously variable transmission, a clutch mechanism, and a travel processor. The continuously variable transmission is coupled to an engine and a first motor via an input passage, and coupled to drive wheels via an output passage. The clutch mechanism is provided on the output passage. When the travel mode is switched from a first mode in which the clutch mechanism is engaged to the second mode in which the clutch mechanism is released, the travel processor releases the clutch mechanism and stops the continuously variable transmission while maintaining a speed ratio of the continuously variable transmission. When the travel mode is switched from the second mode to the first mode, the travel processor synchronizes rotation speeds of input-side and output-side portions of the clutch mechanism by controlling the continuously variable transmission, and engages the clutch mechanism.

8 Claims, 15 Drawing Sheets

(51) Int. Cl.
*B60W 10/06* (2006.01)
*B60W 10/08* (2006.01)

(52) U.S. Cl.
CPC ............. *B60W 2510/0208* (2013.01); *B60W 2510/0283* (2013.01); *B60W 2710/021* (2013.01)

(58) Field of Classification Search
CPC .... B60W 2510/0283; B60W 2710/021; B60K 6/387; B60K 6/448; B60K 6/52; B60K 6/543
See application file for complete search history.

(56) References Cited

U.S. PATENT DOCUMENTS

| | | | |
|---|---|---|---|
| 2017/0282904 A1* | 10/2017 | Morita | B60K 6/387 |
| 2017/0313302 A1* | 11/2017 | Yagasaki | B60K 6/40 |
| 2018/0093660 A1* | 4/2018 | Koshiba | B60W 10/02 |
| 2019/0315243 A1 | 10/2019 | Kodera et al. | |
| 2021/0123526 A1* | 4/2021 | Inoue | B60K 6/387 |

FOREIGN PATENT DOCUMENTS

| | | |
|---|---|---|
| JP | 2006-160104 A | 6/2006 |
| JP | 2018-052320 A | 4/2018 |
| JP | 2019-187130 A | 10/2019 |
| WO | 2013/145104 A1 | 10/2013 |

\* cited by examiner

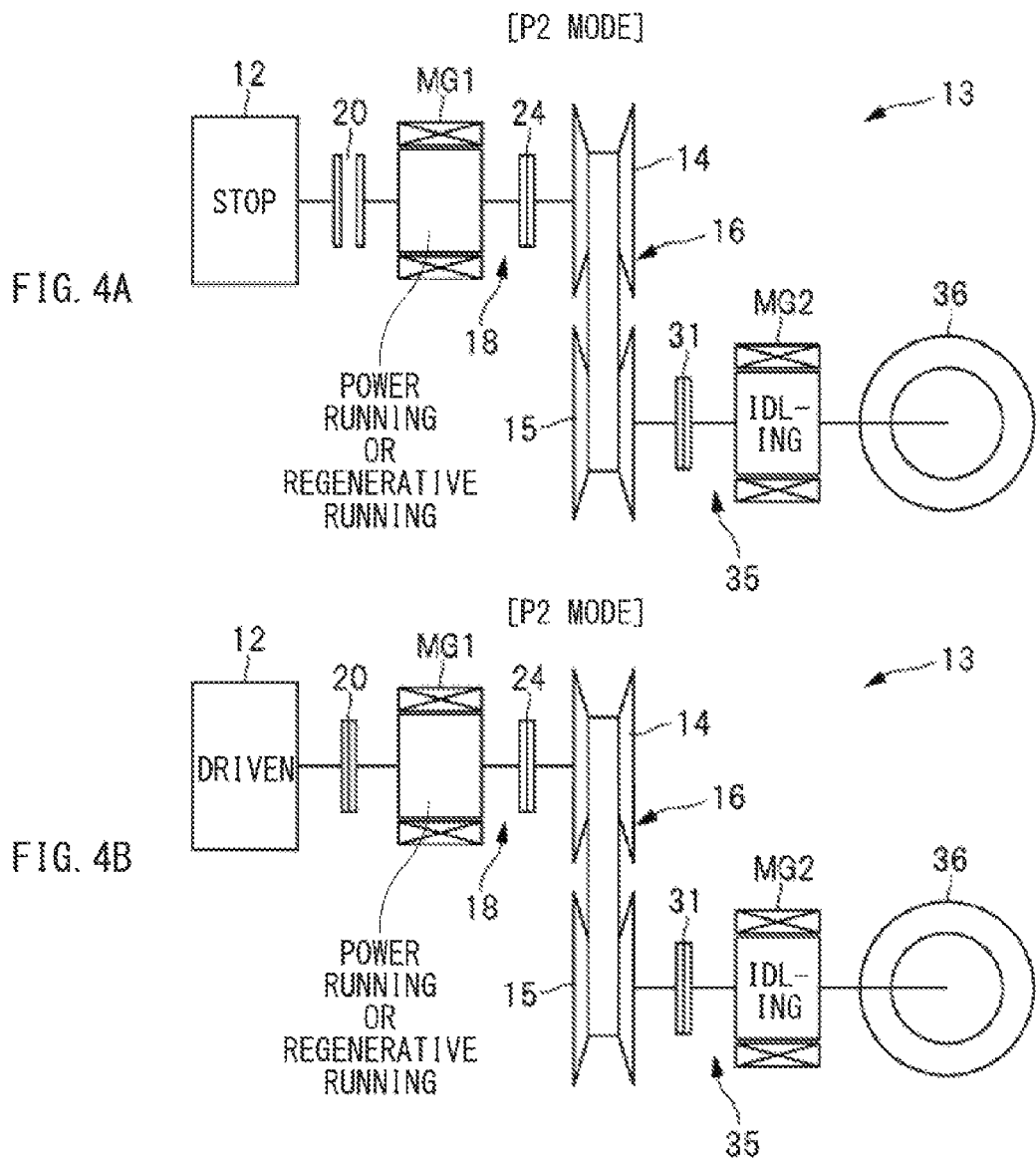

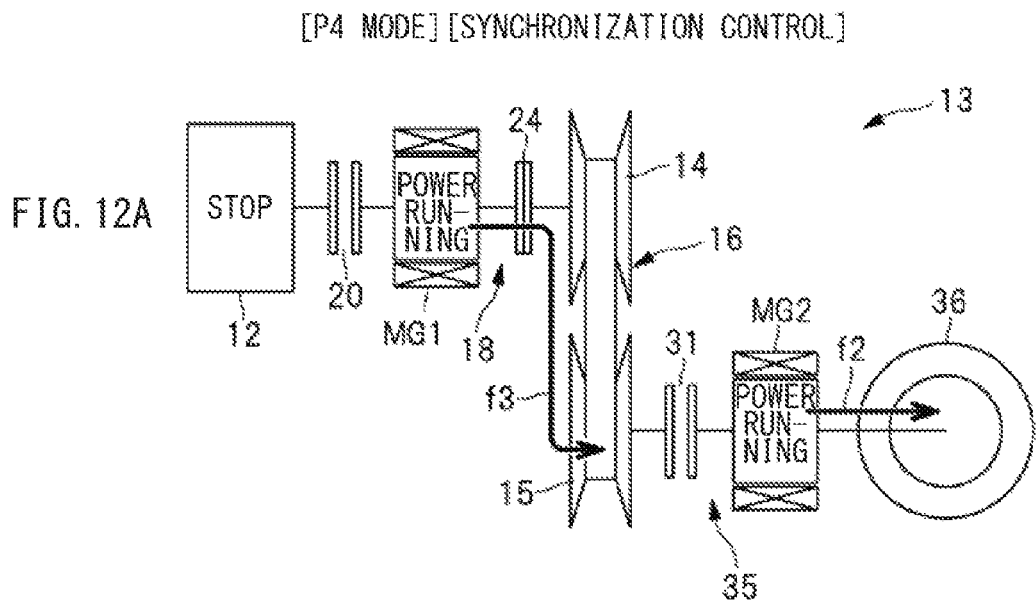
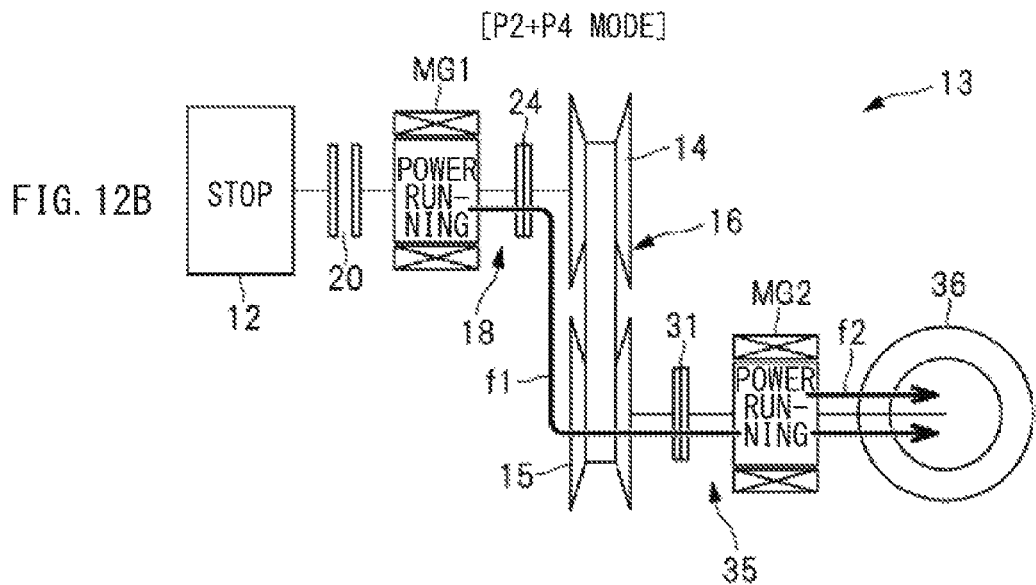

VEHICLE CONTROL APPARATUS

CROSS-REFERENCE TO RELATED APPLICATIONS

The present application claims priority from Japanese Patent Application No. 2020-162855 filed on Sep. 29, 2020 the entire contents of which are hereby incorporated by reference.

BACKGROUND

The technology relates to a vehicle control apparatus to be mounted in a hybrid vehicle.

A hybrid vehicle includes an engine, a motor, and a power train provided with a transmission, such as a continuously variable transmission. The power train includes a clutch mechanism which is controlled to make a switch between a transmission passage for the engine power and a transmission passage for the motor power in the power train. The hybrid vehicle is thereby switched between travel modes including an engine mode and a motor mode. Reference is made to International Publication No. WO 2013/145104, and Japanese Unexamined Patent Application Publication (JP-A) Nos. 2018-52320, 2001-245404, 2006-160104, and 2019-187130.

SUMMARY

An aspect of the technology provides a vehicle control apparatus to be applied to a hybrid vehicle. The vehicle control apparatus includes a continuously variable transmission, a clutch mechanism, and a travel processor. The continuously variable transmission is coupled to an engine and a first motor of the hybrid vehicle via an input passage and is coupled to drive wheels of the hybrid vehicle via an output passage. The clutch mechanism is provided on the output passage. The travel processor is configured to control the engine, the first motor, a second motor coupled to the drive wheels, the continuously variable transmission, and the clutch mechanism. The hybrid vehicle is switchable between travel modes including a first mode in which the clutch mechanism is set to an engaged state and a second mode in which the clutch mechanism is set to a released state. When the travel mode is switched from the first mode to the second mode, the travel processor is configured to set the clutch mechanism to the released state and stop the continuously variable transmission while maintaining a speed ratio of the continuously variable transmission. When the travel mode is switched from the second mode to the first mode, the travel processor is configured to synchronize rotation speeds of an input-side portion and an output-side portion of the clutch mechanism by controlling the continuously variable transmission, and set the clutch mechanism to the engaged state.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 4A is a diagram schematically illustrating an operational status of a power train in a P2 mode.

FIG. 4B is a diagram schematically illustrating an operational status of the power train in the P2 mode.

FIG. 12A is a diagram illustrating an exemplary operational status of the power train observed when the travel mode is switched as indicated by the arrow X illustrated in FIG. 10.

FIG. 12B is a diagram illustrating an exemplary operational status of the power train observed when the travel mode is switched as indicated by the arrow X illustrated in FIG. 10.

DETAILED DESCRIPTION

To engage a clutch mechanism in response to switching of a travel mode, the rotation speeds of an input-side portion and an output-side portion of the clutch mechanism need to be synchronized with each other. To synchronize the rotation speeds of the input-side portion and the output-side portion of the clutch mechanism, the speed of a transmission in a power train needs to be controlled as well as the rotation of the engine and the rotation of the motor. The speed change control of the transmission, however, requires a certain time, making it difficult to promptly switch the travel mode.

It is desirable to provide a vehicle control apparatus that makes it possible to promptly switch the travel mode.

Some example embodiments of the technology will now be described with reference to the attached drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals without any redundant description.

[Exemplary Configuration of Vehicle]

Figure 1:
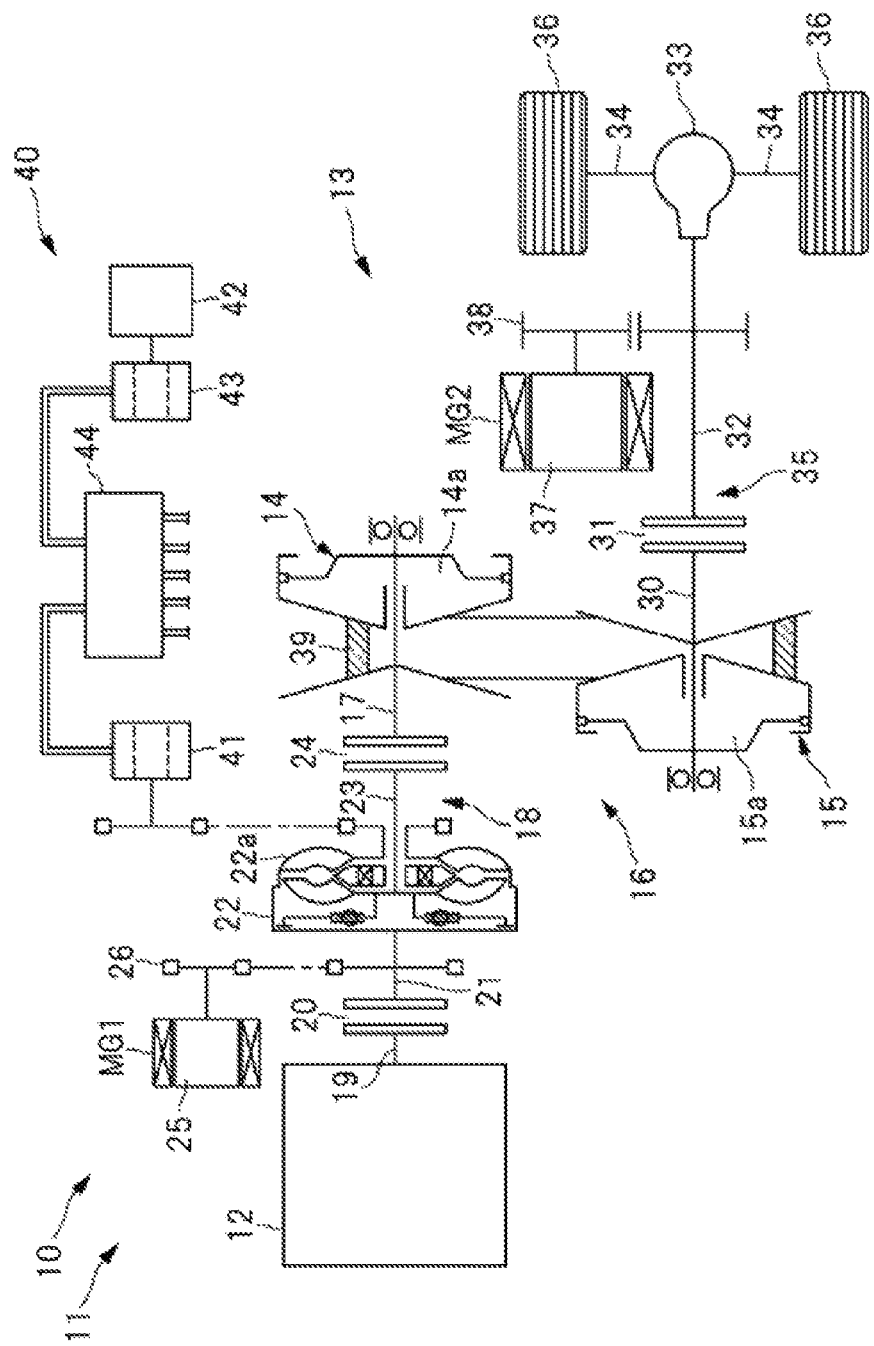
FIG. 1 is a schematic diagram illustrating an exemplary hybrid vehicle including a vehicle control apparatus according to one example embodiment of the technology.

FIG. 1 is a schematic diagram illustrating an example of a hybrid vehicle 11 including a vehicle control apparatus 10 according to an example embodiment of the technology. As illustrated in FIG. 1, the hybrid vehicle 11 may include a power train 13. The power train 13 may include an engine 12, a first motor generator MG1, and a second motor generator MG2 as drive sources. In one embodiment, the first motor generator MG1 may serve as a "first motor". In one embodiment, the second motor generator MG2 may serve as a "second motor". The power train 13 may further include a continuously variable transmission 16 including a primary pulley 14 and a secondary pulley 15.

The primary pulley 14 may have a primary shaft 17 coupled to the engine 12 and the first motor generator MG1 via an input passage 18. In other words, the engine 12 may have a crank shaft 19 coupled to the primary shaft 17 of the primary pulley 14 via an engine clutch 20, an input shaft 21, a torque converter 22, a turbine shaft 23, and an input clutch 24. The first motor generator MG1 may include a rotor 25 coupled to the input shaft 21 via a chain mechanism 26. That is, the input passage 18 may include the engine clutch 20, the chain mechanism 26, the input shaft 21, the torque converter 22, the turbine shaft 23, and the input clutch 24. In the example illustrated in FIG. 1, the first motor generator MG1 may be disposed at a position radially shifted from the input shaft 21; however, this is a non-limiting example. Alternatively, the first motor generator MG1 may be disposed coaxially with the input shaft 21.

The secondary pulley 15 may have a secondary shaft 30 coupled to drive wheels 36 via a output passage 35 including an output clutch 31, an output shaft 32, a differential mechanism 33, and an axle 34. In one embodiment, the output clutch 31 may serve as a "clutch mechanism". The second motor generator MG2 may have a rotor 37 coupled to the output shaft 32 via a gear train 38. That is, the rotor 37 of the second motor generator MG2 may be coupled to the output passage 35 at a position between the output clutch 31 and the drive wheels 36. In the example illustrated in FIG. 1, the second motor generator MG2 may be disposed at a position radially shifted from the output shaft 32; however, this is a non-limiting example. Alternatively, the second motor generator MG2 may be disposed coaxially with the output shaft 32.

The primary pulley 14 may define a primary oil chamber 14a therein, and the secondary pulley 15 may define a secondary oil chamber 15a therein. The primary pulley 14 and the secondary pulley 15 may be wound by a drive chain 39. The hydraulic pressure in the primary oil chamber 14a and the secondary oil chamber 15a may be controlled to control the groove widths of the primary pulley 14 and the secondary pulley 15. This changes the winding diameter of the drive chain 39 running around the primary pulley 14 and the secondary pulley 15, enabling continuously variable shifting from the primary shaft 17 to the secondary shaft 30.

The engine clutch 20 and the input clutch 24 provided on the input passage 18, and the output clutch 31 provided on the output passage 35 may be hydraulic clutches switchable between an engaged state and a released state. When the engine clutch 20 is set to the engaged state, the engine 12 may be coupled to the torque converter 22. When the engine clutch 20 is set to the released state, the engine 12 may be separated from the torque converter 22. When the input clutch 24 is set to the engaged state, the torque converter 22 may be coupled to the primary pulley 14. When the input clutch 24 is set to the released state, the torque converter 22 may be separated from the primary pulley 14. When the output clutch 31 is set to the engaged state, the secondary pulley 15 may be coupled to the drive wheels 36. When the output clutch 31 is set to the released state, the secondary pulley 15 may be separated from the drive wheels 36.

The power train 13 may include a hydraulic system 40 including an oil pump, for example. The hydraulic system 40 may control a hydraulic fluid supply to the continuously variable transmission 16, the torque converter 22, the engine clutch 20, the input clutch 24, the output clutch 31, and so forth. The hydraulic system 40 may include a mechanical pump 41 driven by a pump shell 22a of the torque converter 22, and an electric pump 43 driven by an electric motor 42. The hydraulic system 40 may further include a valve body 44. The valve body 44 may include a solenoid valve and an oil path, and control the supply destination and the pressure of the hydraulic fluid. The hydraulic fluid controlled by the valve body 44 may be supplied to the continuously variable transmission 16, the torque converter 22, the engine clutch 20, the input clutch 24, the output clutch 31, and so forth, through non-illustrated hydraulic pressure circuitry.

[Control System]

Figure 2:
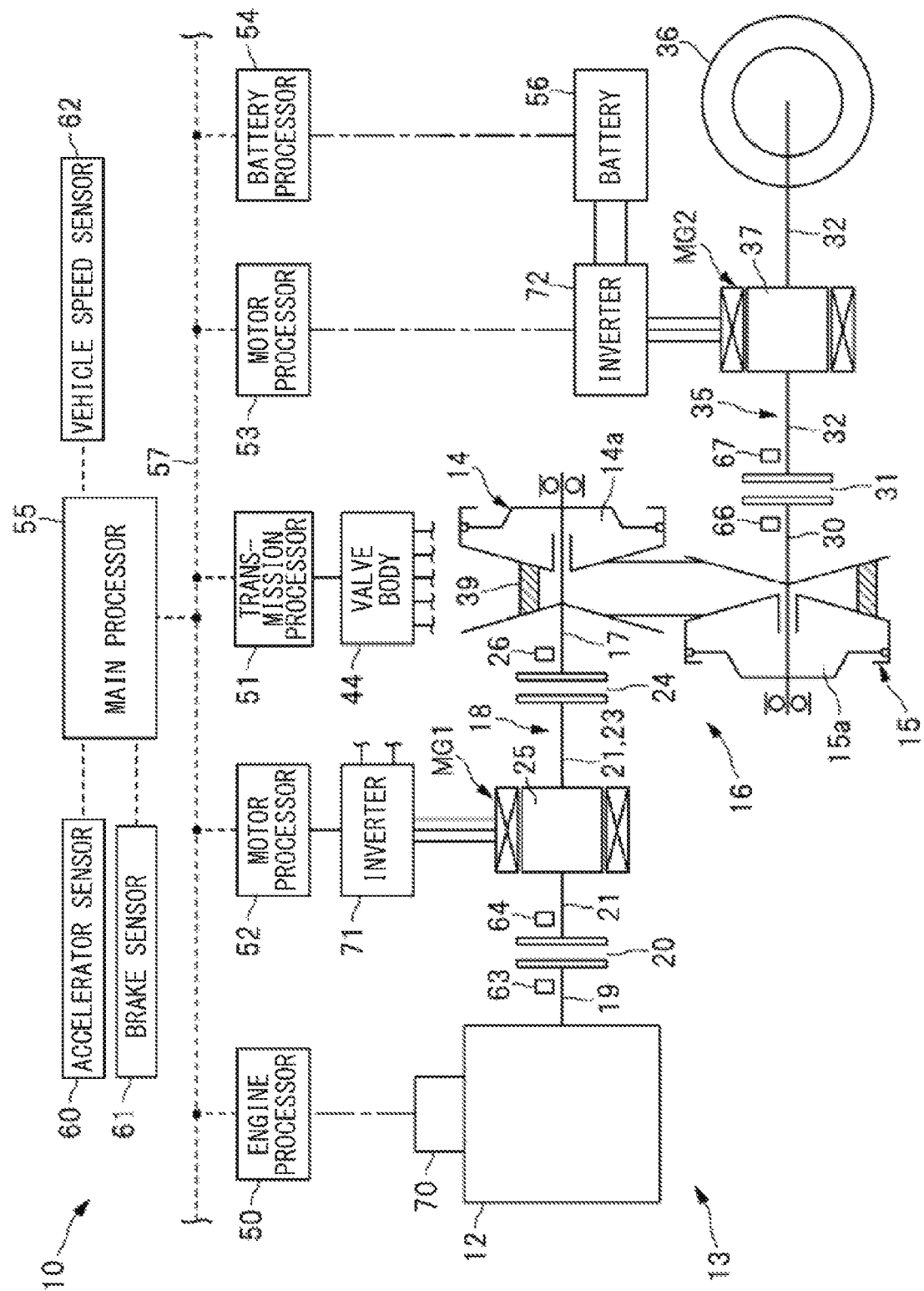
FIG. 2 is a schematic diagram illustrating an exemplary control system of the vehicle control apparatus.

FIG. 2 schematically illustrates an exemplary control system of the vehicle control apparatus 10. Note that FIG. 2 illustrates the power train 13 in a simplified manner. As illustrated in FIG. 2, the vehicle control apparatus 10 may include various processors to control an operational state of the power train 13. The various processors may each include a microcomputer, for example. Examples of the processors may include an engine processor 50 that controls the engine 12, a transmission processor 51 that controls the continuously variable transmission 16 and the output clutch 31, a motor processor 52 that controls the first motor generator MG1, a motor processor 53 that controls the second motor generator MG2, a battery processor 54 that controls a battery 56 coupled to the first motor generator MG1 and the second motor generator MG2, and a main processor 55 that comprehensively controls the processors 50 to 54. These processors 50 to 55 may be communicably coupled to each other via an in-vehicle network 57, such as a CAN or a LIN.

Various sensors to detect a traveling state of the hybrid vehicle 11 may be coupled to the main processor 55. Examples of the sensors coupled to the main processor 55 may include an accelerator sensor 60 that detects an operational state of the accelerator pedal, a brake sensor 61 that detects an operational state of the brake pedal, a vehicle speed sensor 62 that detects a vehicle speed or travel speed of the hybrid vehicle 11, an engine revolution sensor that detects a rotation speed of the crank shaft 19, an input rotation sensor that detects a rotation speed of the input shaft 21, a primary rotation sensor that detects a rotation speed of the primary shaft 17, a secondary rotation sensor that detects a rotation speed of the secondary shaft 30, and an output rotation sensor that detects a rotation speed of the output shaft 32.

The main processor 55 may set control targets of the engine 12, the first motor generator MG1, the second motor generator MG2, the continuously variable transmission 16, the engine clutch 20, the input clutch 24, the output clutch 31, and so forth, on the basis of information received from the various sensors and processors. The main processor 55 may then output control signals indicating these control targets to each of the processors 50 to 54. In one embodiment, the main processor 55 may serve as a "travel processor". After receiving the control signals from the main processor 55, each of the processors 50 to 54 may control the engine 12, the first motor generator MG1, the second motor generator MG2, the continuously variable transmission 16, the engine clutch 20, the input clutch 24, the output clutch 31, and so forth.

For instance, when receiving the control signal from the main processor 55, the engine processor 50 may output the control signal to an engine auxiliary device 70 including, for example, an injector and a throttle valve, so that the engine torque and the engine revolution speed are controlled. The transmission processor 51 may output the control signal to the valve body 44 that controls the hydraulic fluid pressure, so that operational states of the continuously variable transmission 16, the engine clutch 20, the input clutch 24, the output clutch 31, the torque converter 22, and so forth are controlled. The motor processor 52 may output the control signal to an inverter 71 coupled to the first motor generator MG1, so that the motor torque, the motor rotation speed, or the like of the first motor generator MG1 is controlled. The motor processor 53 may output the control signal to an inverter 72 coupled to the second motor generator MG2, so that the motor torque, the motor rotation speed, or the like of the second motor generator MG2 is controlled. The battery 56 may be coupled to the inverters 71 and 72. The battery 56 may be a lithium-ion battery.

[Travel Mode]

The vehicle control apparatus 10 may switch the travel mode of the hybrid vehicle 11 among a P2 mode, a P2+P4 mode, and a P4 mode. In the P2 mode, the hybrid vehicle 11 may travel using the first motor generator MG1. In the P2+P4 mode, the hybrid vehicle 11 may travel using the first motor generator MG1 and the second motor generator MG2. In the P4 mode, the hybrid vehicle 11 may travel using the second motor generator MG2. In one embodiment, the P2 mode and the P2+P4 mode, in which the first motor generator MG1 is used, may serve as a "first mode". In the first mode, the output clutch 31 is set to the engaged state. In one embodiment, the P4 mode, in which the first motor generator MG1 is not used, may serve as a "second mode". In the second mode, the output clutch 31 is set to the released state.

Figure 3:
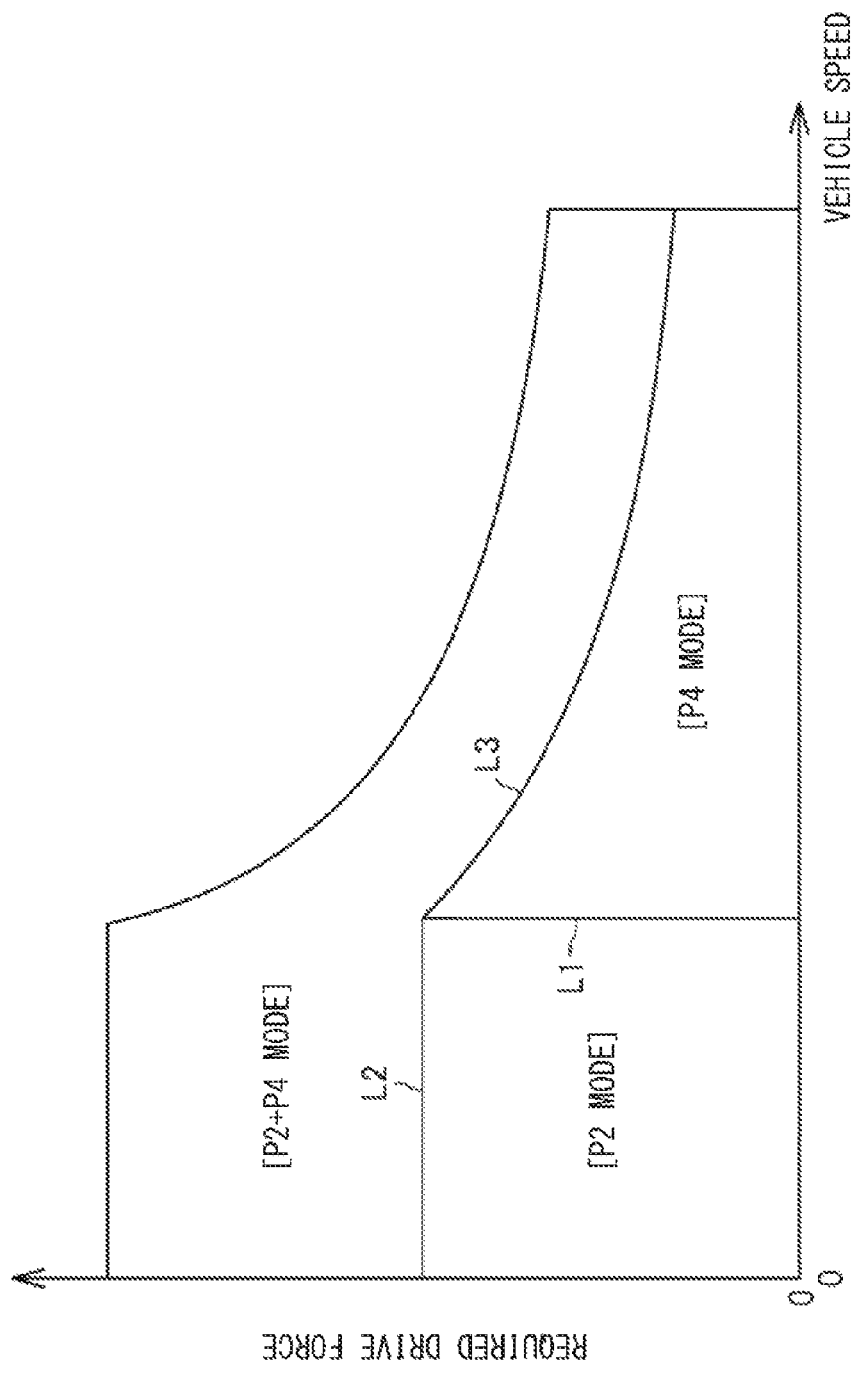
FIG. 3 is a mode map illustrating an exemplary setting region for each travel mode.

FIG. 3 is a mode map illustrating an exemplary setting region of each travel mode. As illustrated in FIG. 3, the mode map may be divided into three setting regions by boundaries L1 to L3 on the basis of a vehicle speed and required drive force. For example, when the traveling state of the hybrid vehicle 11 is determined to be within a range less than a value at the boundary L1 and less than a value at the boundary L2 on the basis of the vehicle speed and the required drive force, the P2 mode may be executed as the travel mode. When the traveling state of the hybrid vehicle 11 is determined to be within a range greater than the value at the boundary L2 and greater than a value at the boundary L3, the P2+P4 mode may be executed as the travel mode. When the traveling state of the hybrid vehicle 11 is determined to be within a range greater than the value at the boundary L1 and less than the value at the boundary L3, the P4 mode may be executed as the travel mode. Note that the required drive force or a target drive force of the hybrid vehicle 11 may be set on the basis of an accelerator operation performed by a driver. For example, the required drive force may be set to a larger value as the stepping-in amount of the accelerator pedal increases, whereas to a smaller value as the stepping-in amount of the accelerator pedal decreases.

FIGS. 4A and 4B schematically illustrate operational statuses of the power train 13 in the P2 mode. In the P2 mode, the input clutch 24 and the output clutch 31 may be set to the engaged state, the first motor generator MG1 may be set a power-running state or a regenerative running state, and the second motor generator MG2 may be set to an idling state, as illustrated in FIGS. 4A and 4B. Accordingly, the motor drive power may be transmitted from the first motor generator MG1 via the continuously variable transmission 16 to the drive wheels 36. The hybrid vehicle 11 may be driven by the motor drive power outputted from the first motor generator MG1.

In a case where the required drive force is covered by only the first motor generator MG1, the engine clutch 20 may be set to the released state, and the engine 12 may be set to a stopped state, as illustrated in FIG. 4A. In contrast, in a case where the required drive force is not covered by only the first motor generator MG1, the engine clutch 20 may be set to the engaged state, and the engine 12 may be set to a driving state, as illustrated in FIG. 4B. In a case where it is difficult to drive the first motor generator MG1 due to, for example, a shortage of electric power in the battery 56, the hybrid vehicle 11 may be driven by only the engine 12. When the hybrid vehicle 11 is driven by only the engine 12, a clutch for separating the first motor generator MG1 from the input shaft 21 may be released to stop the first motor generator MG1 from rotating.

Figure 5A:
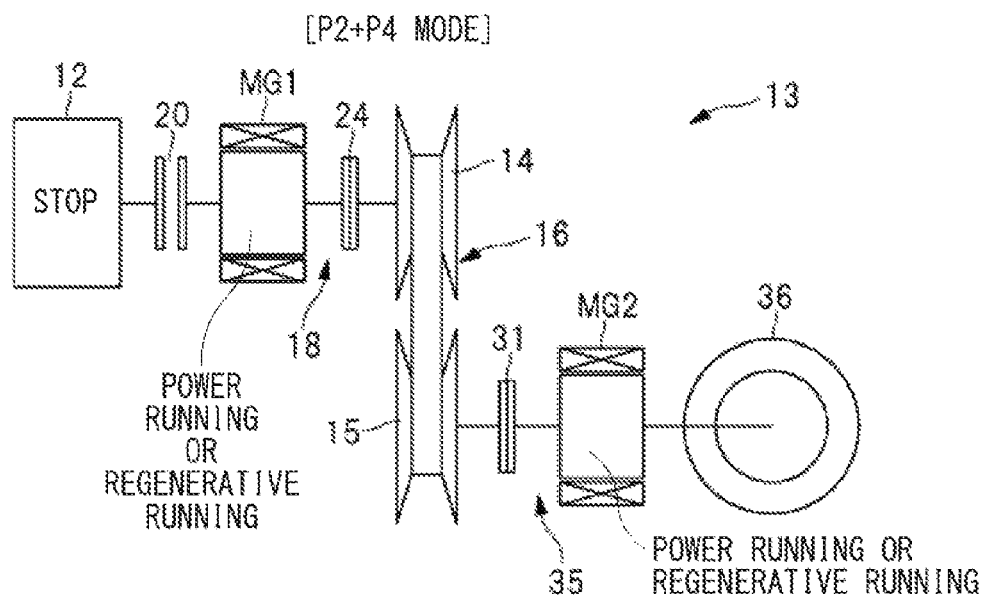
FIG. 5A is a diagram schematically illustrating an operational status of the power train in a P2+P4 mode.
Figure 5B:
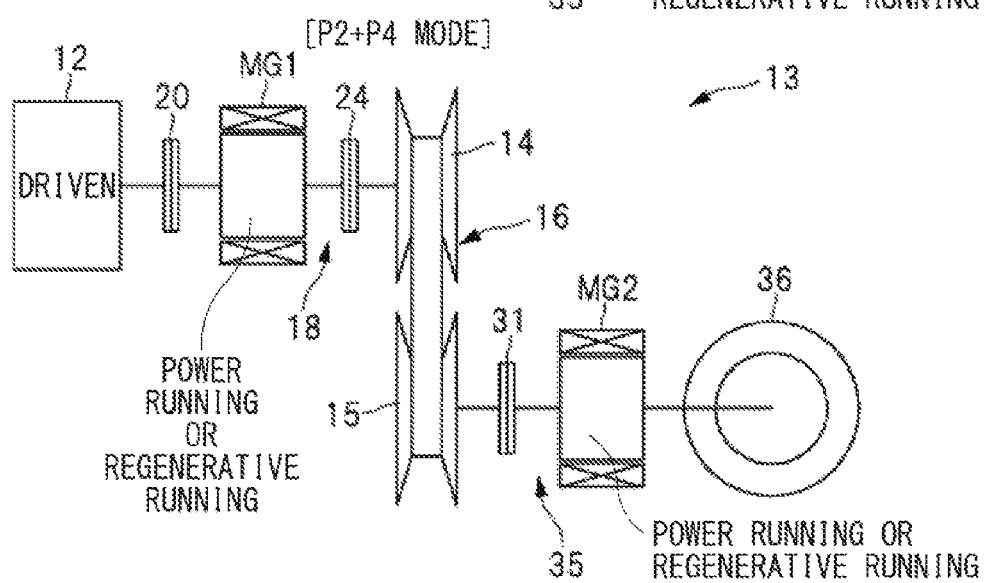
FIG. 5B is a diagram schematically illustrating an operational status of the power train in the P2+P4 mode.

FIGS. 5A and 5B schematically illustrate operational statuses of the power train 13 in the P2+P4 mode. In the P2+P4 mode, the input clutch 24 and the output clutch 31 may be set to the engaged state, the first motor generator MG1 may be set to the power-running state or the regenerative running state, and the second motor generator MG2 may be set to the power-running state or the regenerative running state, as illustrated in FIGS. 5A and 5B. Accordingly, the motor drive power may be transmitted from the first motor generator MG1 and the second motor generator MG2 to the drive wheels 36. The hybrid vehicle 11 may be driven by the motor drive power outputted from both the first motor generator MG1 and the second motor generator MG2.

In a case where the required drive force is satisfied by only the first motor generator MG1 and the second motor generator MG2 in the P2+P4 mode, the engine clutch 20 may be set to the released state, and the engine 12 may be set to the stopped state, as illustrated in FIG. 5A. In contrast, in a case where the required drive force is not covered by only the first motor generator MG1 and the second motor generator MG2, the engine clutch 20 may be set to the engaged state, and the engine 12 may be set to the driving state, as illustrated in FIG. 5B. In a case where it is difficult to drive the first motor generator MG1 and the second motor generator MG2 in the P2+P4 mode due to, for example, a shortage of electric power in the battery 56, the hybrid vehicle 11 may be driven by only the engine 12. When the hybrid vehicle 11 is driven by only the engine 12, the clutch for separating the first motor generator MG1 from the input shaft 21 may be released to stop the first motor generator MG1 from rotating.

Figure 6:
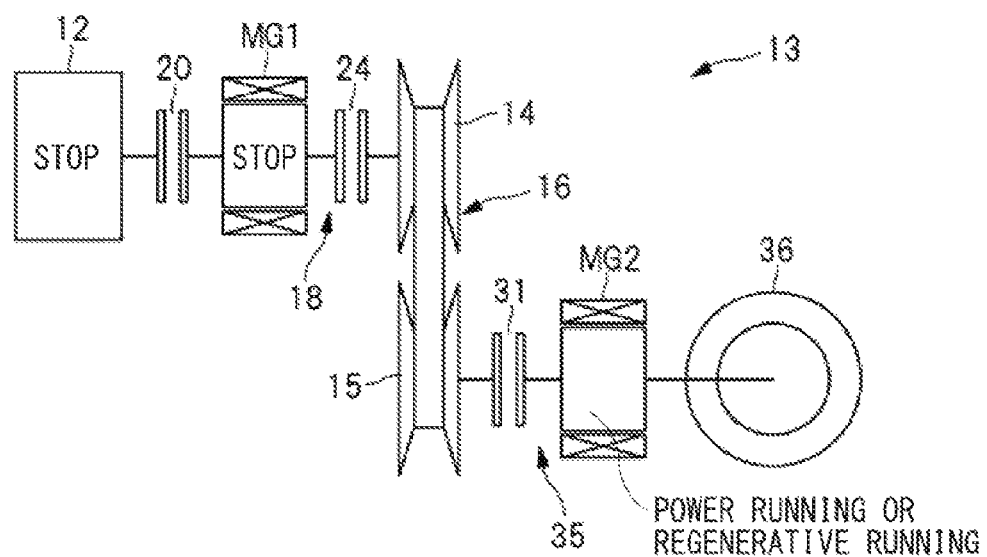
FIG. 6 is a diagram schematically illustrating an operational status of the power train in a P4 mode

FIG. 6 schematically illustrates an operational status of the power train 13 in the P4 mode. In the P4 mode, the engine clutch 20, the input clutch 24, and the output clutch 31 may be set to the released state, the engine 12 and the first motor generator MG1 may be set to the stopped state, and the second motor generator MG2 may be set to the power-running state or the regenerative running state, as illustrated in FIG. 6. Accordingly, the motor drive power may be transmitted from the second motor generator MG2 to the drive wheels 36. The hybrid vehicle 11 may be driven by the motor drive power outputted from the second motor generator MG2. In the P4 mode, the engine 12 and the first motor generator MG1 may be set to the stopped state, and the output clutch 31 may be set to the released state, as described above. The continuously variable transmission 16 may thus be set to a stopped state in which the primary pulley 14 and the secondary pulley 15 are stopped from rotating.

As described above, in the first mode, namely, in the P2 mode or the P2+P4 mode, the output clutch 31 may be set to the engaged state, the output clutch 31 may be set to the engaged state, the continuously variable transmission 16 may be set to the rotating state, at least one of the engine 12 or the first motor generator MG1 may be set to the rotating state, and the second motor generator MG2 may be set to the rotating state. In contrast, in the second mode, namely, in the P4 mode, the output clutch 31 may be set to the released state, the continuously variable transmission 16 may be set to the stopped state, both the engine 12 and the first motor generator MG1 may be set to the stopped state, and the second motor generator MG2 may be set to the rotating state. Note that the wording "the rotating state" of the first motor generator MG1 or the second motor generator MG2 may refer to a state where the rotor of the first motor generator MG1 or the second motor generator MG2 is rotating in the power-running state, the regenerative running state, or the idling state. [Speed Change Control of Continuously Variable Transmission] Now described is speed change control of the continuously variable transmission 16 performed by the main processor 55. While the hybrid vehicle 11 is traveling in the P2 mode or the P2+P4 mode, the engine drive power and the motor drive power may be outputted through the continuously variable transmission 16. The speed ratio of the continuously variable transmission 16 may thus be controlled by the main processor 55.

Figure 7:
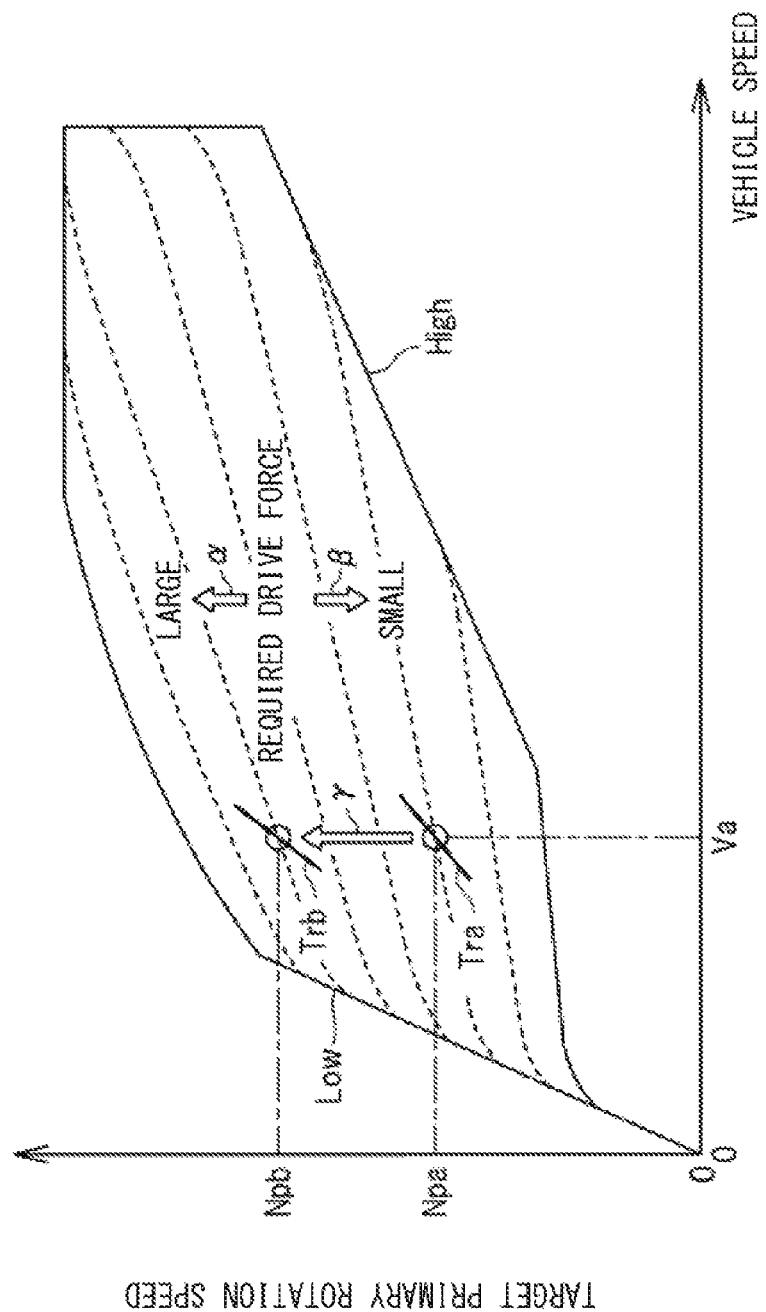
FIG. 7 is an exemplary speed change map of a continuously variable transmission.

FIG. 7 illustrates an exemplary speed change map of the continuously variable transmission 16. As illustrated in FIG. 7, the speed change map may include a characteristic line indicating the maximum speed ratio Low on a low side and a characteristic line indicating the minimum speed ratio High on a high side. The speed change map may further include a plurality of characteristic lines, which are indicated by broken lines. The characteristic lines may be associated with the respective required drive forces. As the required drive force is increased by increasing the stepping-in amount of the accelerator pedal, a characteristic line located at a higher position in the direction indicated by an arrow α may be selected. In contrast, as the required drive force is reduced by reducing the stepping-in amount of the accelerator pedal, a characteristic line located at a lower position in the direction indicated by an arrow β may be selected.

For example, in a case where the required drive force of the hybrid vehicle 11 is increased by increasing the stepping-in amount of the accelerator pedal while the hybrid vehicle 11 is traveling at a vehicle speed Va, the target primary rotation speed may be increased from Npa to Npb, as illustrated by an arrow γ. Accordingly, the target speed ratio of the continuously variable transmission 16 may be changed from Tra to Trb. That is, the target speed ratio of the continuously variable transmission 16 may be increased from Tra to Trb on the low side, and the torque outputted from the continuously variable transmission 16 may increase with the increase in the required drive force. Note that the wording "the speed ratio of the continuously variable transmission 16" may refer to the ratio of the rotation speed Np of the primary shaft 17 to the rotation speed Ns of the secondary shaft 30 (Np:Ns).

[Speed Ratio at Boundary]

Figure 8:
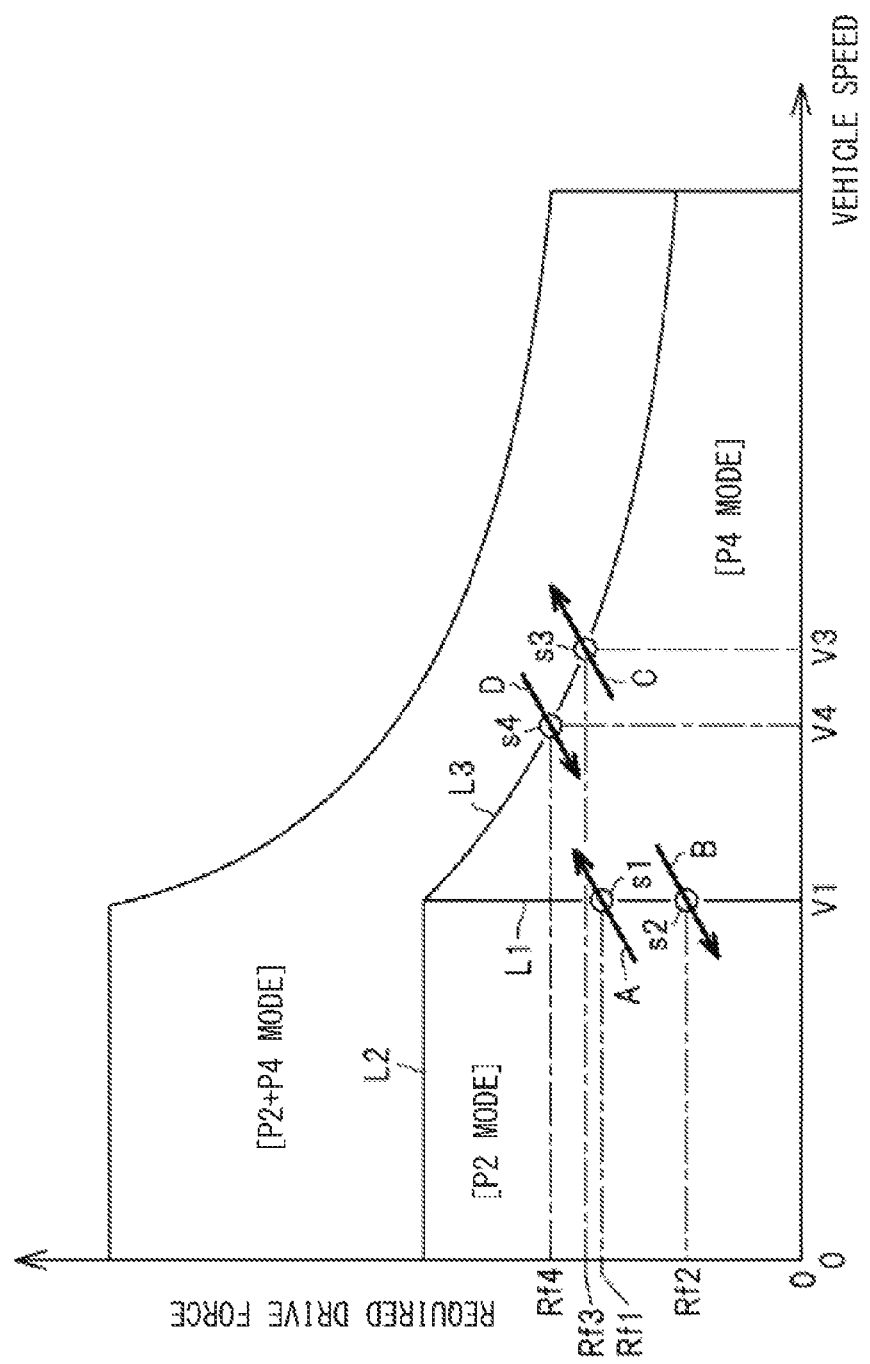
FIG. 8 is a diagram illustrating exemplary vehicle speeds and exemplary required drive forces at boundaries L1 and L3.
Figure 9:
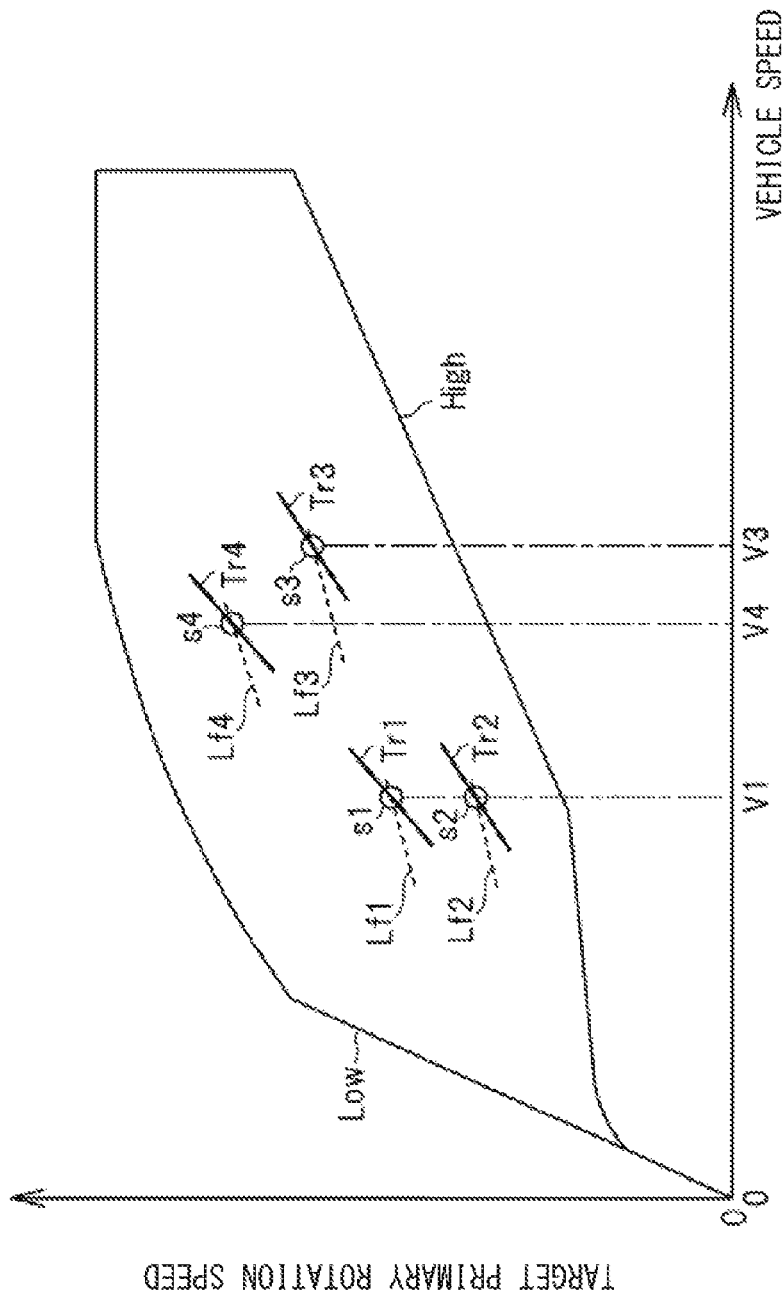
FIG. 9 is a diagram illustrating exemplary target speed ratios at the boundaries L1 and L3.

Now described are the speed ratios at the boundaries L1 and L3 of the mode map. FIG. 8 illustrates exemplary vehicle speeds and exemplary required drive forces at the boundary L1 and L3. FIG. 9 illustrates exemplary target speed ratios at the boundaries L1 and L3.

When the vehicle speed and the required drive force of the hybrid vehicle 11 increase across the boundary L1 as indicated by an arrow A in FIG. 8, the travel mode may be switched from the P2 mode to the P4 mode at a timing s1 in FIG. 8. At the timing s1, the required drive force may be Rf1, and the vehicle speed may be V1. In this case, at the timing s1, a characteristic line Lf1 corresponding to the required drive force Rf1 may be selected, and the target speed ratio of the continuously variable transmission 16 may be set to a speed ratio Tr1 corresponding to the vehicle speed V1, as illustrated in FIG. 9.

When the vehicle speed and the required drive force of the hybrid vehicle 11 fall below the boundary L1 as indicated by an arrow B in FIG. 8, the travel mode may be switched from the P4 mode to the P2 mode at a timing s2 in FIG. 8. At the timing s2, the required drive force may be Rf2, and the vehicle speed may be V1. In this case, at the timing s2, a characteristic line Lf2 corresponding to the required drive force Rf2 may be selected, and the target speed ratio of the continuously variable transmission 16 may be set to a speed ratio Tr2 corresponding to the vehicle speed V1, as illustrated in FIG. 9.

When the vehicle speed and the required drive force of the hybrid vehicle 11 increase across the boundary L3 as indicated by an arrow C in FIG. 8, the travel mode may be switched from the P4 mode to the P2+P4 mode. For example, the travel mode is switched from the P4 mode to the P2+P4 mode at a timing s3 illustrated in FIG. 8. At the timing s3, the required drive force may be Rf3, and the vehicle speed may be V3. In this case, a characteristic line Lf3 corresponding to the required drive force Rf3 may be selected, and the target speed ratio of the continuously variable transmission 16 may be set to a speed ratio Tr3 corresponding to the vehicle speed V3, as illustrated in FIG. 9.

When the vehicle speed and the required drive force of the hybrid vehicle 11 fall below the boundary L3 as indicated by an arrow D in FIG. 8, the travel mode may be switched from the P2+P4 mode to the P4 mode at a timing s4 in FIG. 8. At the timing s4, the required drive force may be Rf4, and the vehicle speed may be V4. In this case, a characteristic line Lf4 corresponding to the required drive force Rf4 may be selected, and the target speed ratio of the continuously variable transmission 16 may be set to a speed ratio Tr4 corresponding to the vehicle speed V4, as illustrated in FIG. 9.

[Travel Mode Switching Control]

Figure 10:
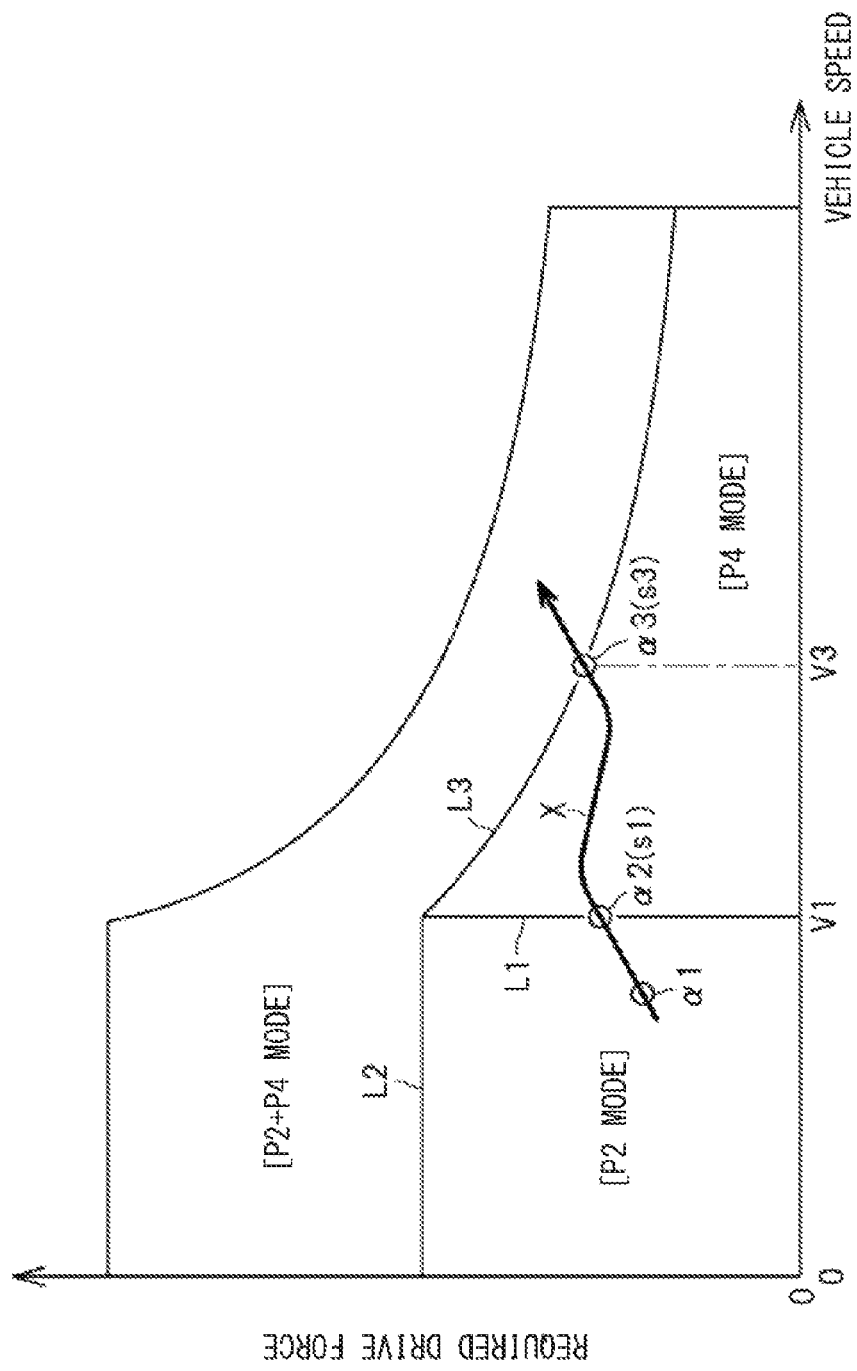
FIG. 10 is a diagram illustrating an exemplary transition of the vehicle speed and the required drive force using an arrow X.

Now described is a procedure for executing travel mode switching control. FIG. 10 illustrates an arrow X indicating an exemplary transition of the vehicle speed and the required drive force. The arrow X in FIG. 10 illustrates an exemplary state of the hybrid vehicle 11 transiting from the P2 mode through the P4 mode to the P2+P4 mode. Note that the traveling states of the hybrid vehicle 11 at the timings s1 and s3 in FIG. 10 may be the same as those at the timings s1 and s3 in FIG. 9. FIGS. 11 and 12 illustrate exemplary operational statuses of the power train 13 observed when the travel mode is switched as indicated by the arrow X illustrated in FIG. 10.

Figure 11A:
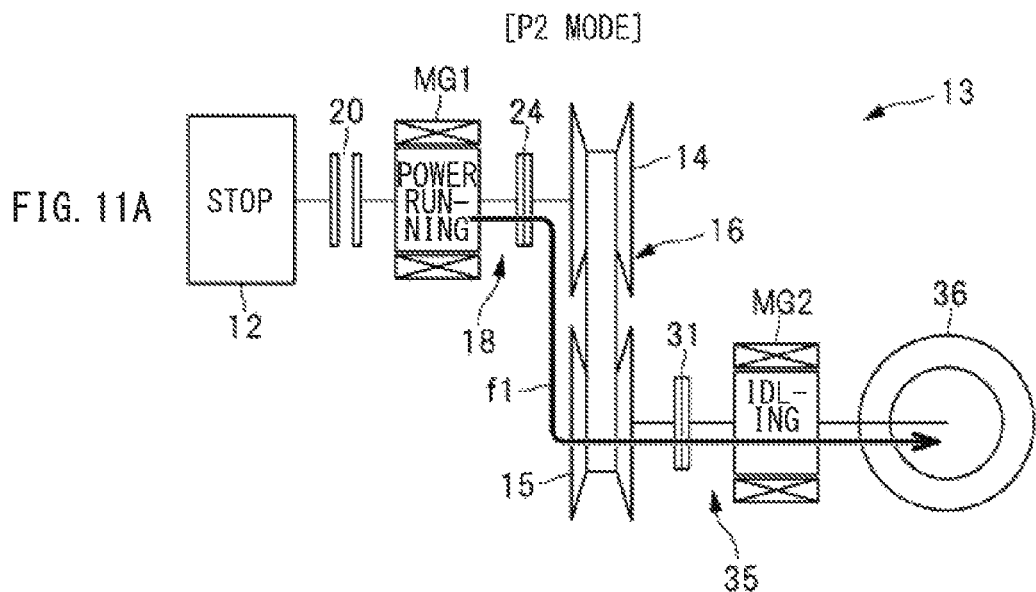
FIG. 11A is a diagram illustrating an exemplary operational status of the power train observed when the travel mode is switched as indicated by the arrow X illustrated in FIG. 10.

When the vehicle speed and the required drive force fall below the boundaries L1 and L2 as indicated by a reference α1 in FIG. 10, the travel mode may be set to the P2 mode. In this case, as illustrated in FIG. 11A, the input clutch 24 and the output clutch 31 may be set to the engaged state, the first motor generator MG1 may be set to the power-running state, and the second motor generator MG2 may be set to the idling state. Accordingly, the motor drive power may be transmitted from the first motor generator MG1 through the continuously variable transmission 16 to the drive wheels 36, as indicated by an arrow f1. Note that, in the example illustrated in FIG. 11A, the engine clutch 20 may be set to the released state, and the engine 12 may be set to the stopped state.

Figure 11B:
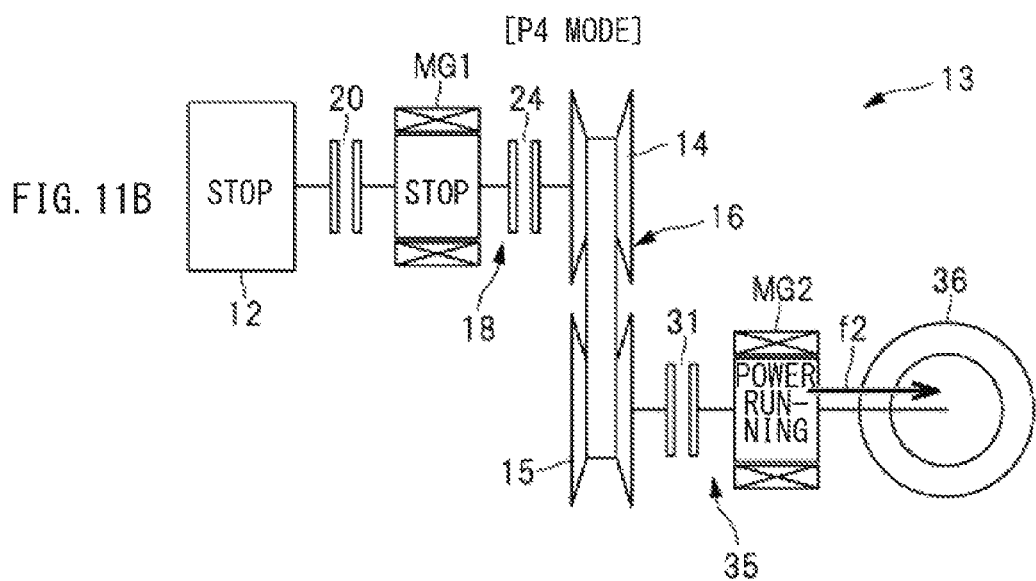
FIG. 11B is a diagram illustrating an exemplary operational status of the power train observed when the travel mode is switched as indicated by the arrow X illustrated in FIG. 10.

Thereafter, when the vehicle speed and the required drive force reach the boundary L1 as indicated by a reference α2 in FIG. 10, the travel mode may be switched from the P2 mode to the P4 mode. In this case, as illustrated in FIG. 11B, the input clutch 24 and the output clutch 31 may be set to the released state, the continuously variable transmission 16 may be set to the stopped state, the first motor generator MG1 may be set to the stopped state, and the second motor generator MG2 may be set to the power-running state. Accordingly, the motor drive power may be transmitted from the second motor generator MG2 to the drive wheels 36, as indicated by an arrow f2.

When the travel mode is switched from the P2 mode to the P4 mode as indicated by the reference a2 in FIG. 10, the output clutch 31 is set to the released state, and thereafter, the continuously variable transmission 16 is set to the stopped state while the speed ratio of the continuously variable transmission 16 is maintained at the speed ratio set in the P2 mode. That is, when the continuously variable transmission 16 is set to the stopped state, the speed ratio of the continuously variable transmission 16 is maintained at the speed ratio set in the P2 mode without being set to the minimum speed ratio High or the maximum speed ratio Low even in the P4 mode in which the continuously variable transmission 16 is not used.

Thereafter, when the vehicle speed and the required drive force reach the boundary L3 as indicated by a reference a3 in FIG. 10, the travel mode may be switched from the P4 mode to the P2+P4 mode. In this case, the output clutch 31 needs to be set to the engaged state to switch the travel mode from the P4 mode to the P2+P4 mode. To engage the output clutch 31, the rotation speeds of the input-side portion and the output-side portion of the output clutch 31 need to be synchronized with each other so that a shock applied to the output clutch 31 is reduced at the time of engaging.

To synchronize the rotation speeds of the input-side portion and the output-side portion of the output clutch 31, the input clutch 24 may be set to the engaged state, the first motor generator MG1 may be set to the power-running state, and the speed ratio of the continuously variable transmission 16 may be controlled while the output clutch 31 is maintained in the released state, as in the power train 13 illustrated in FIG. 12A. Accordingly, the motor drive power may be transmitted from the second motor generator MG2 to the drive wheels 36, as indicated by the arrow f2, and the rotation speed of the secondary shaft 30 may be increased by the motor drive power transmitted from the first motor generator MG1, as indicated by an arrow f3. When the difference in the rotation speed between the input-side portion and the output-side portion of the output clutch 31 converges within a predetermined range under the synchronization control, the output clutch 31 may be set to the engaged state, as illustrated in FIG. 12B. Accordingly, the motor drive power may be transmitted from the first motor generator MG1 and the second motor generator MG2 to the drive wheels 36, as illustrated by the arrows f1 and f2.

Figure 13:
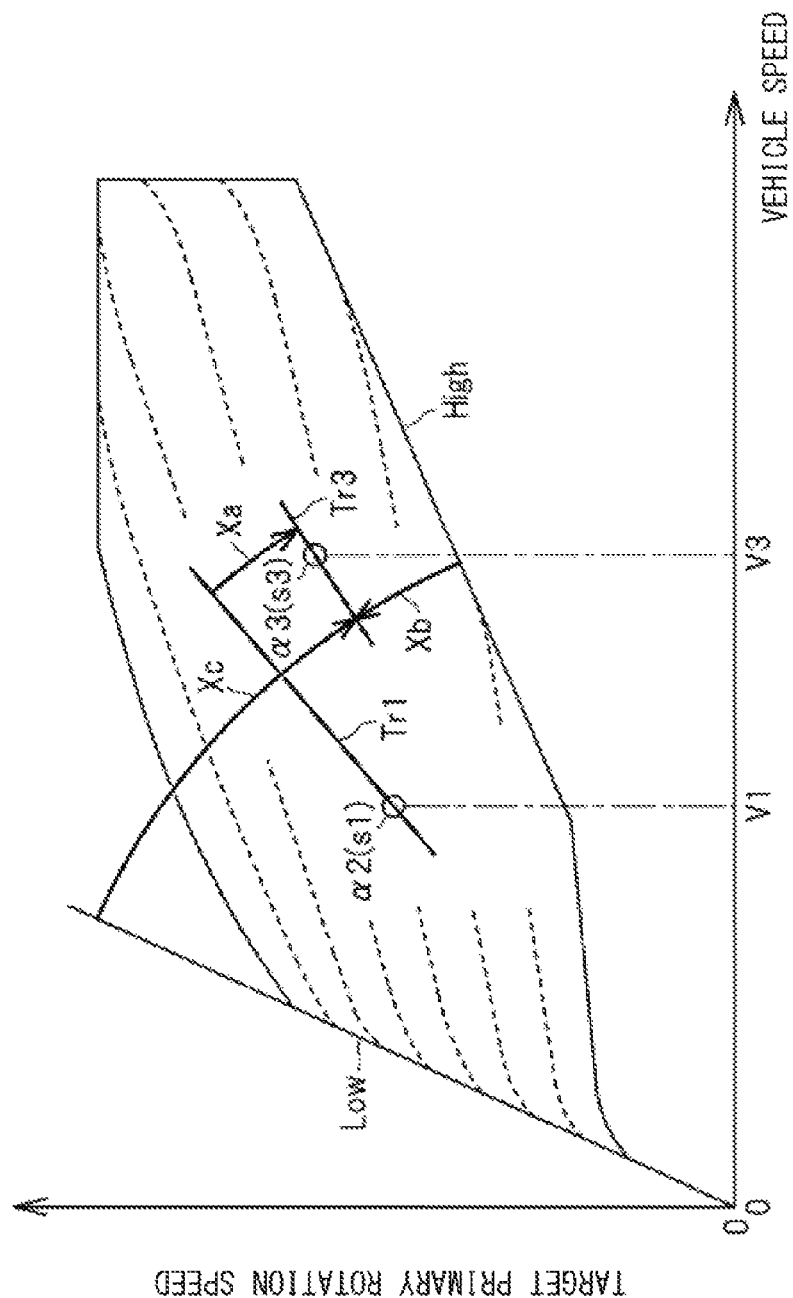
FIG. 13 is a diagram illustrating an exemplary speed change of the continuously variable transmission under synchronization control.

FIG. 13 illustrates an exemplary speed change of the continuously variable transmission 16 under the synchronization control. As indicated by an arrow Xa illustrated in FIG. 13, the speed ratio of the continuously variable transmission 16 may be changed from the speed ratio Tr1 to the speed ratio Tr3 under the synchronization control illustrated in FIG. 12A. For example, when the travel mode is switched from the P2 mode to the P4 mode as illustrated by the reference a2 in FIG. 10, the output clutch 31 may be released, and the continuously variable transmission 16 may be stopped while the speed ratio of the continuously variable transmission 16 is set to the speed ratio Tr1, at the timing s1 in FIG. 9. Thereafter, when the travel mode is switched to the P2+P4 mode as indicated by the reference a3 in FIG. 10, the output clutch 31 may be engaged, and the speed ratio of the continuously variable transmission 16 may be controlled toward the speed ratio Tr3, at the timing s3 in FIG. 9.

That is, in the P4 mode in which the output clutch 31 is released, the speed ratio of the continuously variable transmission 16 may be maintained at the speed ratio Tr1 set in the P2 mode immediately before the P4 mode. Thereafter, when the travel mode is switched from the P4 mode to the P2+P4 mode, the speed ratio of the continuously variable transmission 16 may be changed from the speed ratio Tr1 to the speed ratio Tr3 under the synchronization control, as indicated by the arrow Xa in FIG. 13. This reduces the speed change width of the continuously variable transmission 16 in the synchronization control, making it possible to promptly complete the speed change control and the synchronization control.

If the speed ratio of the continuously variable transmission 16 were set to the minimum speed ratio High or the maximum speed ratio Low in the P4 mode in which the output clutch 31 is released, the speed change width of the continuously variable transmission 16 in the synchronization control could increase as illustrated by arrows Xb and Xc in FIG. 13. This could hinder the speed change control and the synchronization control from being promptly completed, making it difficult to promptly switch the travel mode. However, the vehicle control apparatus 10 according to the present example embodiment maintains the speed ratio of the continuously variable transmission 16 at a value between the minimum speed ratio High and the maximum speed ratio Low in the P4 mode in which the output clutch 31 is released. This reduces the speed change width of the continuously variable transmission 16 in the synchronization control, making it possible to promptly switch the travel mode.

In the above description, the speed change width of the continuously variable transmission 16 in the synchronization control is reduced when the travel mode is switched from the P2 mode to the P2+P4 mode through the P4 mode; however, this example is non-limiting. The speed change width of the continuously variable transmission 16 in the synchronization control is reduced also when the travel mode is switched from the P2 mode to the P4 mode as indicated by the arrow A in FIG. 8, and thereafter switched from the P4 mode to the P2 mode as illustrated by the arrow B in FIG. 8, for example. The speed change width of the continuously variable transmission 16 in the synchronization control is reduced also when the travel mode is switched from the P2+P4 mode to the P4 mode as indicated by the arrow D in FIG. 8, and thereafter switched from the P4 mode to the P2 mode as indicated by the arrow B in FIG. 8. The speed change width of the continuously variable transmission 16 in the synchronization control is reduced also when the travel mode is switched from the P2+P4 mode to the P4 mode as indicated by the arrow D in FIG. 8, and thereafter switched from the P4 mode to the P2+P4 mode as indicated by the arrow C in FIG. 8.

[Travel Mode Switching Control (Timing Chart)]

Figure 14:
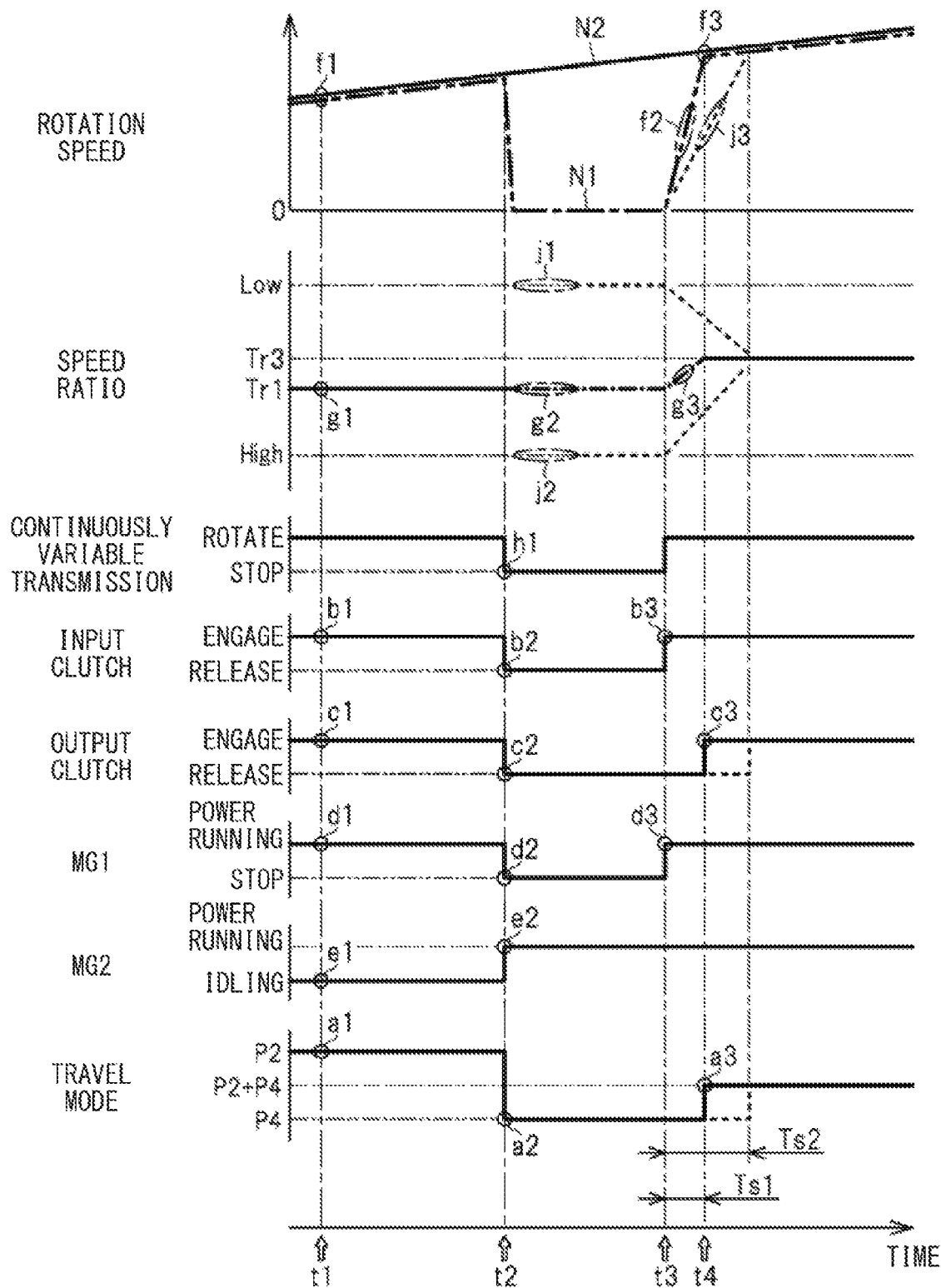
FIG. 14 is a timing chart illustrating an exemplary operational state of the power train observed when the travel mode is switched as indicated by the arrow X in FIG. 10.

The travel mode switching control described above will now be described with reference to a timing chart illustrated in FIG. 14. FIG. 14 illustrates an exemplary operational status of the power train 13 observed when the travel mode is switched as indicated by the arrow X in FIG. 10. In FIG. 14, the rotation speed of the secondary shaft 30, i.e., the rotation speed of an input-side portion of the output clutch 31 may be indicated by a rotation speed N1, while the rotation speed of the output shaft 32, i.e., the rotation speed of an output-side portion of the output clutch 31 may be indicated by a rotation speed N2. To simplify the description of the travel mode switching control, the speed ratio of the continuously variable transmission 16 may be maintained at a constant value in the P2 mode and the P4 mode in the example illustrated in FIG. 14.

At time t1, the travel mode of the hybrid vehicle 11 is set to the P2 mode, as indicated by a reference a1 in FIG. 14. At the time t1, the input clutch 24 and the output clutch 31 may be set to the engaged states as indicated by the references b1 and c1, the first motor generator MG1 may be set to the power-running state as indicated by a reference d1, and the second motor generator MG2 may be set to the idling state as indicated by the reference e1. Because the output clutch 31 is engaged in the P2 mode, the rotation speed N1 of the input-side portion and the rotation speed N2 of the output-side portion of the output clutch 31 may be identical to each other as indicated by a reference f1. In the P2 mode, the speed ratio of the continuously variable transmission 16 may be set to the speed ratio Tr1 as indicated by a reference g1.

At time t2, the travel mode may be switched from the P2 mode to the P4 mode, as indicated by a reference a2. At the time t2, the input clutch 24 and the output clutch 31 may be set to the released states as indicated by the references b2 and c2, the first motor generator MG1 may be set to the stopped state as indicated by a reference d2, the second motor generator MG2 may be set to the power-running state as indicated by a reference e2, and the continuously variable transmission 16 may be set to the stopped state as indicated by a reference h1. Even after the continuously variable transmission 16 is set to the stopped state, the speed ratio of the continuously variable transmission 16 is maintained at the speed ratio set in the P2 mode. That is, when the continuously variable transmission 16 is set to the stopped state, the speed ratio of the continuously variable transmission 16 is maintained at the speed set in the P2 mode without being set to the minimum speed ratio High or the maximum speed ratio Low even in the P4 mode in which the continuously variable transmission 16 is not used, as indicated by a reference g2.

At time t3, the travel mode is determined to be switched to the P2+P4 mode. At the time t3, the input clutch 24 may be set to the engaged state as indicated by a reference b3, the first motor generator MG1 may be set to the power-running state as indicated by a reference d3, and the speed ratio of the continuously variable transmission 16 may be controlled toward the speed ratio Tr3, which is a target speed ratio set for the P2+P4 mode, as indicated by a reference g3. When the first motor generator MG1 is set to the power-running state and the speed ratio of the continuously variable transmission 16 is controlled toward the target speed ratio as described above, the rotation speed N1 of the input-side portion of the output clutch 31 may increase toward the rotation speed N2 of the output-side portion of the output clutch 31, as indicated by a reference f2. Thereafter, at time t4, the rotation speed N1 of the input-side portion may reach the rotation speed N2 of the output-side portion as indicated by a reference f3, eliminating the difference in the rotation speed between the input-side portion and the output-side portion of the output clutch 31. The output clutch 31 may thus be set to the engaged state as indicated by a reference c3. As a result, switching from the P4 mode to the P2+P4 mode may be completed as indicated by a reference a3. Accordingly, the speed change width of the continuously variable transmission 16 is reduced, making it possible to shorten synchronization time Ts1. It is therefore possible to promptly switch the travel mode.

If the speed ratio of the continuously variable transmission 16 were set to the minimum speed ratio High or the maximum speed ratio Low as indicated by a reference j1 or j2 in the P4 mode in which the output clutch 31 is released, the speed change width of the continuously variable transmission 16 could increase, the rotation speed N1 of the input-side portion could moderately increase as indicated by a reference j3, and synchronization time Ts2 could become longer than the synchronization time Ts1 in the synchronization control. This could make it difficult to promptly switch the travel mode. However, the vehicle control apparatus 10 according to the present example embodiment maintains the speed ratio at a value between the minimum speed ratio High and the maximum speed ratio Low in the P4 mode in which the output clutch 31 is released. This shortens the speed change width of the continuously variable transmission 16 in the synchronization control, making it possible to promptly switch the travel mode.

Other Example Embodiments (Exemplary Structure of Power Train)

Figure 15A:
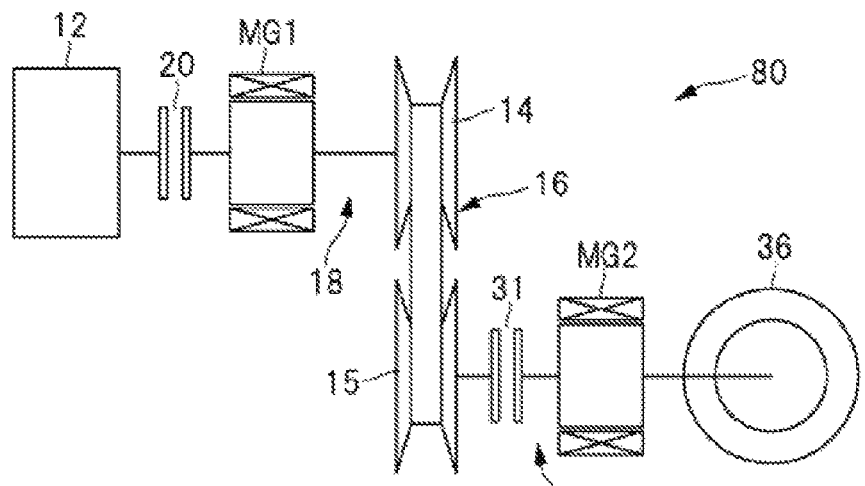
FIG. 15A is a diagram illustrating a power train of the vehicle control apparatus according to one example embodiment of the technology.
Figure 15B:
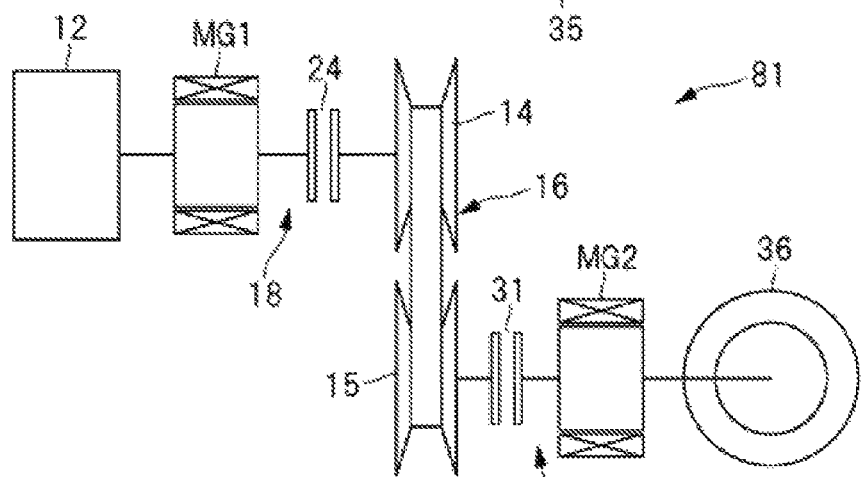
FIG. 15B is a diagram illustrating a power train of the vehicle control apparatus according to one example embodiment of the technology.
Figure 15C:
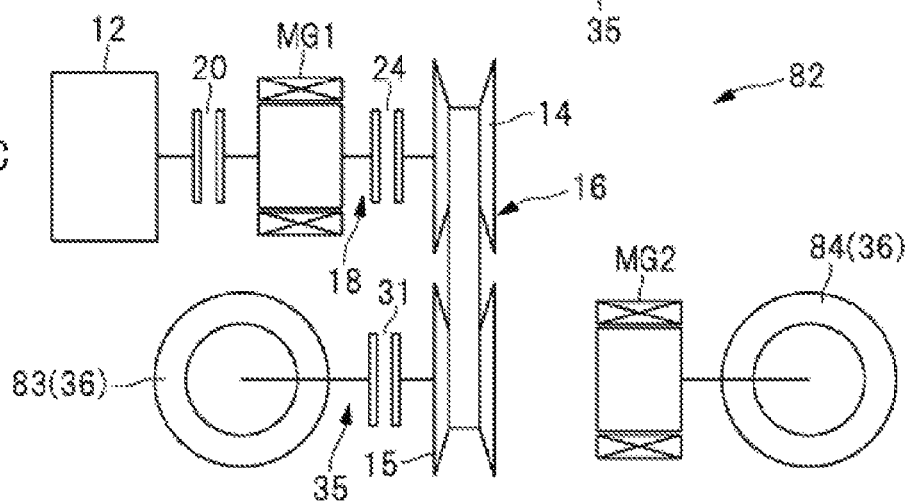
FIG. 15C is a diagram illustrating a power train of the vehicle control apparatus according to one example embodiment of the technology.

FIG. 15A illustrates a power train 80 according to another example embodiments of the technology. FIG. 15B illustrates a power train 81 according to still another example embodiment of the technology. FIG. 15C illustrates a power train 82 according to yet another example embodiment of the technology. In FIGS. 15A to 15C, components common to those in FIGS. 1 and 2 are denoted with the same reference numerals without any redundant description.

In the example illustrated in FIG. 1, the input clutch 24 may be provided on the input-side of the primary pulley 14; however, this is a non-limiting example. Alternatively, the input clutch 24 provided on the input-side of the primary pulley 14 may be omitted, as in the power train 80 illustrated in FIG. 15A. Further, in the example illustrated in FIG. 1, the engine clutch 20 may be provided on the output-side of the engine 12; however, this is a non-limiting example. Alternatively, the engine clutch 20 provided on the output-side of the engine 12 may be omitted, as in the power train 81 illustrated in FIG. 15B.

Further, in the example illustrated in FIG. 1, the second motor generator MG2 may be coupled to the output passage 35; however, this is a non-limiting example.

Alternatively, the second motor generator MG2 may be separated from the output passage 35 of the continuously variable transmission 16. That is, as in the power train 82 illustrated in FIG. 15C, the output passage 35 of the continuously variable transmission 16 may be coupled to a front wheel 83 (i.e., one of the drive wheels 36), and the second motor generator MG2 may be coupled to a rear wheel 84 (the other drive wheels 36). Still alternatively, the output passage 35 of the continuously variable transmission 16 may be coupled to the rear wheel 84, and the second motor generator MG2 may be coupled to the front wheel 83.

It should be appreciated that the technology is not limited to the foregoing example embodiments and that various modifications may be made without departing from the gist of the technology. In the foregoing example embodiments, the first mode may refer to the P2 mode and the P2+P4 mode, and the second mode may refer to the P4 mode; however, this is a non-limiting example. Alternatively, the first mode or the second mode may include another travel mode. Further, in the foregoing example embodiments, the power train 13 may include the torque converter 22; however, this is a non-limiting example. Alternatively, the torque converter 22 may be omitted from the power train 13. Further, in the foregoing example embodiments, the second motor generator MG2 may be coupled to the output shaft 32; however, this is a non-limiting example. Alternatively, the second motor generator MG2 may be incorporated in the differential mechanism 33, or may be coupled to the axle 34.

In the foregoing example embodiments, the first motor generator MG1 may be coupled to the input shaft 21 via the chain mechanism 26; however, this is a non-limiting example. Alternatively, the first motor generator MG1 may be coupled to the input shaft 21 via a gear train. Still alternatively, the rotor of the first motor generator MG1 may be directly coupled to the input shaft 21. Further, in the foregoing example embodiments, the main processor 55 may serve as the travel processor; however, this is a non-limiting example. Alternatively, the engine processor 50, the motor processor 52, or the transmission processor 51 may serve as the travel processor, for example.

According to at least one of the foregoing example embodiments of the technology, when the travel mode is switched from the first mode to the second mode, the travel processor sets the clutch mechanism to the released state and stops the continuously variable transmission while maintaining the speed ratio of the continuously variable transmission. Accordingly, it is possible to promptly switch the travel mode from the second mode to the first mode.

The main processor 55 in the vehicle control apparatus 10 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main processor 55. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the main processor in the vehicle control apparatus 10 illustrated in FIG. 2.

The invention claimed is:

1. A vehicle control apparatus to be applied to a hybrid vehicle, the vehicle control apparatus comprising:
   a continuously variable transmission coupled to an engine and a first motor of the hybrid vehicle via an input passage and coupled to drive wheels of the hybrid vehicle via an output passage;
   a clutch mechanism provided on the output passage; and
   a travel processor configured to control the engine, the first motor, a second motor coupled to the drive wheels, the continuously variable transmission, and the clutch mechanism, wherein
   the hybrid vehicle is switchable between travel modes including a first mode in which the clutch mechanism is set to an engaged state and a second mode in which the clutch mechanism is set to a released state,
   when the travel mode is switched from the first mode to the second mode, the travel processor is configured to set the clutch mechanism to the released state and stop the continuously variable transmission while maintaining a speed ratio of the continuously variable transmission, and
   when the travel mode is switched from the second mode to the first mode, the travel processor is configured to synchronize rotation speeds of an input-side portion and an output-side portion of the clutch mechanism by controlling the continuously variable transmission, and set the clutch mechanism to the engaged state.

2. The vehicle control apparatus according to claim 1, wherein
   the travel processor is configured to maintain the speed ratio of the continuously variable transmission at a value between a minimum speed ratio and a maximum speed ratio in the second mode in which the continuously variable transmission is stopped.

3. The vehicle control apparatus according to claim 1, wherein
   the first mode comprises a travel mode in which the clutch mechanism is set to the engaged state, the continuously variable transmission is set to a rotating state, at least either one of the engine and the first motor is set to a rotating state, and the second motor is set to a rotating state, and
   the second mode comprises a travel mode in which the clutch mechanism is set to the released state, the continuously variable transmission is set to a stopped state, both the engine and the first motor are set to stopped states, and the second motor is set to the rotating state.

4. The vehicle control apparatus according to claim 2, wherein
   the first mode comprises a travel mode in which the clutch mechanism is set to the engaged state, the continuously variable transmission is set to a rotating state, at least either one of the engine and the first motor is set to a rotating state, and the second motor is set to a rotating state, and the second mode comprises a travel mode in which the clutch mechanism is set to the released state, the continuously variable transmission is set to a stopped state, both the engine and the first motor are set to stopped states, and the second motor is set to the rotating state.

5. The vehicle control apparatus according to claim 1, wherein the second motor is coupled to the output passage provided between the clutch mechanism and the drive wheels.

6. The vehicle control apparatus according to claim 2, wherein the second motor is coupled to the output passage provided between the clutch mechanism and the drive wheels.

7. The vehicle control apparatus according to claim 3, wherein the second motor is coupled to the output passage provided between the clutch mechanism and the drive wheels.

8. The vehicle control apparatus according to claim 4, wherein the second motor is coupled to the output passage provided between the clutch mechanism and the drive wheels.

* * * * *